US006925748B2

(12) United States Patent
McGill et al.

(10) Patent No.: US 6,925,748 B2
(45) Date of Patent: Aug. 9, 2005

(54) FLEXIBLE APPARATUS COVER PROVIDING ELECTRICAL SHOCK UPON CONTACT

(76) Inventors: David Taylor McGill, 43460 Via Barrozo, Temecula, CA (US) 92592; Cheryl Gay McGill, 43460 Bia Barrozo, Temecula, CA (US) 92592

( * ) Notice: Subject to any disclaimer, the term of this patent is extended or adjusted under 35 U.S.C. 154(b) by 0 days.

(21) Appl. No.: 10/811,379

(22) Filed: Mar. 26, 2004

(65) Prior Publication Data

US 2005/0132636 A1 Jun. 23, 2005

Related U.S. Application Data

(63) Continuation-in-part of application No. 10/728,505, filed on Dec. 5, 2003, now Pat. No. 6,817,138.

(51) Int. Cl.$^7$ ............................................. A01M 19/00
(52) U.S. Cl. ......................................................... 43/98
(58) Field of Search ........................... 43/98; 361/232; 114/361; 93/98

(56) References Cited

U.S. PATENT DOCUMENTS

| | | | | |
|---|---|---|---|---|
| 1,848,625 A | * | 3/1932 | Hagar ........................... 43/112 |
| 2,473,183 A | * | 6/1949 | Watson ......................... 219/543 |
| 3,211,153 A | * | 10/1965 | Gambetti ...................... 607/149 |
| 3,366,854 A | * | 1/1968 | Robinson ..................... 361/232 |
| 3,392,247 A | * | 7/1968 | Check ........................ 200/86 R |
| 4,299,048 A | * | 11/1981 | Bayes ............................. 43/98 |
| 4,475,141 A | * | 10/1984 | Antonevich ................. 361/220 |
| 4,700,054 A | * | 10/1987 | Triplett et al. .............. 219/545 |
| 4,713,725 A | * | 12/1987 | Kroll ........................... 361/232 |
| 4,722,354 A | * | 2/1988 | Axelgaard et al. .......... 607/152 |
| 4,884,062 A | * | 11/1989 | Lin et al. .................. 340/568.7 |
| 4,949,216 A | * | 8/1990 | Djukastein .................. 361/232 |
| 4,969,418 A | * | 11/1990 | Jones .......................... 119/712 |
| 4,997,127 A | * | 3/1991 | McEwen ........................ 231/7 |
| 5,023,433 A | * | 6/1991 | Gordon ....................... 219/548 |
| 5,049,704 A | * | 9/1991 | Matouschek ................. 174/261 |
| 5,107,620 A | * | 4/1992 | Mahan ........................ 43/112 |
| 5,158,039 A | * | 10/1992 | Clark .......................... 119/712 |
| 5,301,678 A | * | 4/1994 | Watson et al. .............. 600/534 |
| 5,813,360 A | * | 9/1998 | Dickey, Jr. .................. 114/161 |
| 6,082,285 A | * | 7/2000 | Hinrichs ..................... 114/343 |
| 6,341,444 B1 | * | 1/2002 | Cina et al. ..................... 43/98 |
| 6,519,131 B1 | * | 2/2003 | Beck ........................... 361/232 |
| 6,540,303 B2 | * | 4/2003 | Mosquera ............... 361/452.58 |
| 6,649,886 B1 | * | 11/2003 | Kleshchik .................... 219/529 |
| 6,817,138 B1 | * | 11/2004 | McGill et al. ................. 43/98 |
| 2002/0092481 A1 | * | 7/2002 | Spooner ...................... 119/908 |

* cited by examiner

Primary Examiner—Teri Pham Luu
Assistant Examiner—Jordan Lofdahl
(74) Attorney, Agent, or Firm—Gene Scott Patent Law & Venture GP.

(57) ABSTRACT

A flexible blanket is made of plural layers including a pair of mutually insulated electrically conductive layers. Electrically conductive stitchings extend between the electrically conductive layers, and a top abrasion resistant layer and are exposed on its exterior surface. A voltage potential is applied between the conductive layers so that the exposed stitches can provide an electric shock to an animal's foot when it is brought into contact with the exposed surface.

7 Claims, 3 Drawing Sheets

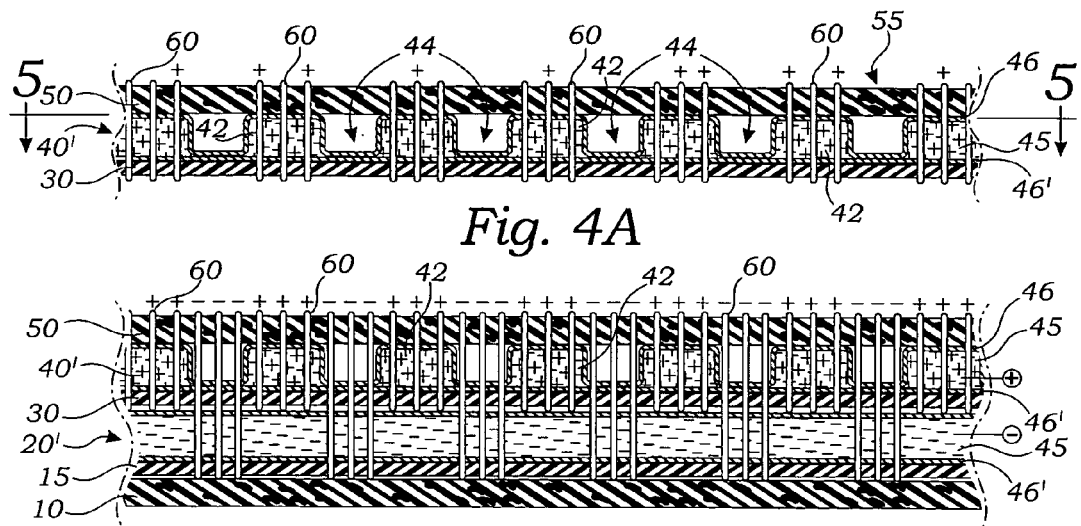
Fig. 4A
Fig. 4B
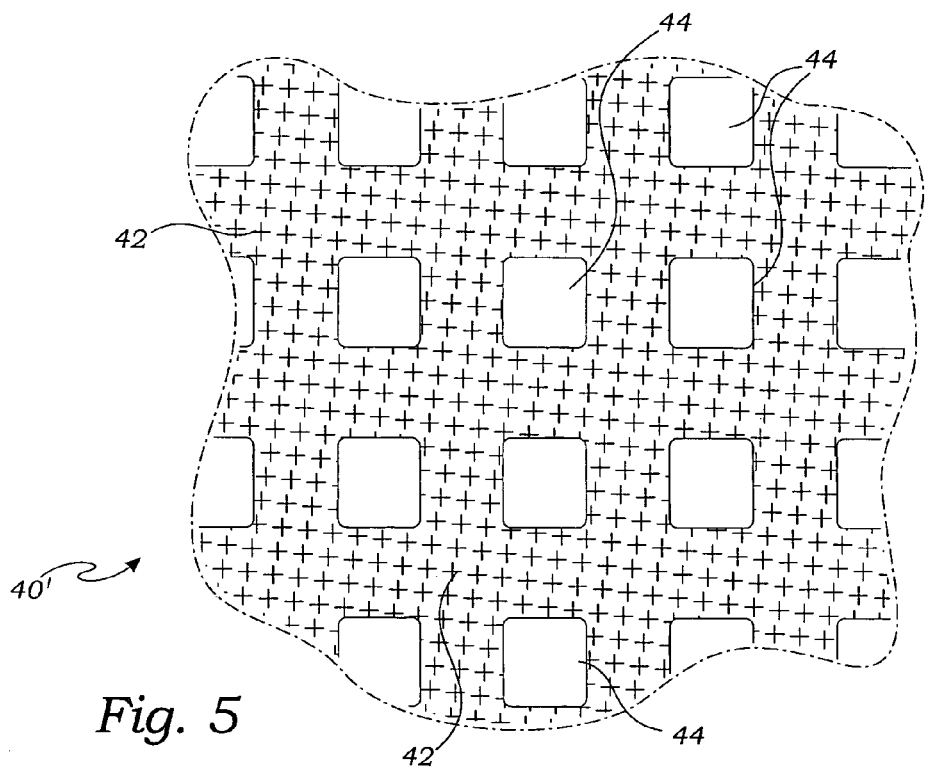
Fig. 5

FLEXIBLE APPARATUS COVER PROVIDING ELECTRICAL SHOCK UPON CONTACT

RELATED APPLICATIONS

This application is a Continuation In Part Application of a prior filed application having Ser. No. 10/728,505 and filing date of Dec. 5, 2003 now U.S. Pat. No. 6,817,138 and entitled: Flexible Cover Providing Electrical Shock Upon Contact.

INCORPORATION BY REFERENCE

Applicant(s) hereby incorporate herein by reference, any and all U.S. patents, U.S. patent applications, and other documents and printed matter cited or referred to in this application.

BACKGROUND OF THE INVENTION

1. Field of the Invention

This invention relates generally to covers or blankets for machines, boats, cars and such, and more particularly to such a cover having a set of electrically conductive stitches on one side so that an electrical shock is received by an animal coming into contact with the cover.

2. Description of Related Art

The following art defines the present state of this field:

Robinson, U.S. Pat. No. 3,366,854 describes an installation for repelling birds from a roosting surface comprising: a source of electrical power; a unitary electrical cable comprising a pair of spaced apart longitudinal conductors separated by an elongated body of insulating material therebetween, the cross-sectional dimensions of said cable being such that the cable is utilizable as a perch for birds, an elongated surface on each of said conductors being free of covering insulating material to be exposed along a major portion of the length of said cable, the spacing between the exposed portions of said conductors being such as to always provide a current path primarily through a foot of a bird perched on said cable because of simultaneous contact between each conductor and apposed digits on the single foot of the bird; means for supporting said conductors in a substantially horizontal plane to promote the simultaneous contact between each conductor and apposed digits on a single foot of a bird perched on said cable; and means connecting said conductors to said power source.

Bayes, U.S. Pat. No. 4,399,048 describes an electrical device for mass exterminating of objectable pest birds, such as starlings or the like; the device including an overhead cable supported between posts, the cable carrying a plurality of spaced-apart copper electrodes along its outer side, so that, when a horde of pest birds try to land upon the wire by their toes straddling it, they close an electric circuit between the electrodes, which are connected to a power source, so that the birds are thus electrocuted.

Djukastein, U.S. Pat. No. 4,949,216 describes a device for discouraging small domestic or wild animals from frequenting areas where they may become a nuisance. The device comprises a mat made of non-conductive material to be spread over the area. A plurality of conductive surfaces are spaced on the upper surface of the mat so that adjacent conductive surfaces are electrically insulated from each other. An electric control is associated with the conductive surfaces and provides electric power thereto so that when an animal walks on the mat its body completes a circuit between live and ground areas on the mat and the animal is thereby provided with an unpleasant electrical sensation.

Jones, U.S. Pat. No. 4,969,418 describes an apparatus and method for training animals having active and passive components. The animal is trained to avoid entering an area by a mild shock which the animal received when it treads on a visible interdigital array. Eventually the animal is deterred by viewing the array alone and the shocking means is removed. The visible array can be supplemented with electroluminescent, olfactory or audio stimuli.

Dickey, Jr., U.S. Pat. No. 5,813,360 describes a vehicle cover including a sheet of flexible material for covering and protecting at least the upper portion of the vehicle, a securing band coupled with the sheet adjacent the edge thereof, and a preferred ratchet for releasably tightening the band about the periphery of the vehicle below a portion of the vehicle presenting a greater periphery. The band is sufficiently tightened to prevent slipping over the greater periphery and can be locked in the tightened position in order to prevent unauthorized intrusion into the vehicle.

Hinrichs, U.S. Pat. No. 6,082,285 describes a sea bird marine craft protector having an elevated protector net for preventing sea birds, such as sea gulls and the like, from landing on deck and superstructure of a marine craft and supports or struts for supporting and elevating the protector net above the deck and above the superstructure. The sea bird marine craft protector has fasteners for fastening the protector net to a rail on the deck and fasteners on stern of the marine craft, for pulling the protector net taut, and for maintaining the protector net at a minimum height above the deck and the superstructure. Additionally, the sea bird marine craft protector has strut support mounts, which are mounted on port deck and starboard deck of the marine craft, respectively, for supporting the struts therebetween, maintaining the struts in user selected positions, and for maintaining the minimum height of the protector net above the deck and the superstructure. The protector net is elevated to the minimum height, which is greater than the length of the longest sea bird's legs, that a user intends to protect the marine craft from. The protector net has a mesh, which is smaller than the width of the body of the smallest sea bird, that the user intends to protect the marine craft from and entering and landing therethrough. The minimum height and the mesh may vary, depending upon the user's needs. The sea bird marine craft protector may have a reel for letting out and winding up the protector net.

Beck, U.S. Pat. No. 6,519,131 describes an electric cattle guard formed of first and second elongated mats, said second mat received in an upper face of the first mat. Both mats are formed of a flexible insulating material with the second mat interspersed with electrically conductive particles, fibers or a mixture thereof in an amount sufficient to apply a high voltage, low energy shock to an animal making contact with the second elongated mat when it energized. A conductive strip adapted to make electrical contact with an electric fence energizer is provided at one or both ends of the second elongated mat.

Spooner, U.S. 2002/0092481 describes a method and apparatus for confining animals or livestock and preventing their traverse through a gate. Mats are provided having an insulated substrate holding an electrically conductive medium embedded therein. A power source supplies electrical current to the conductive medium. When the power source is activated, the mats may convey a shock to an animal. The mats are located in a gate passage so as to enable normal operation of the gate while preventing the traverse of livestock or animals within the gated area.

Dressel, EP 0377550 describes a vineyard having conductive trellis wires which extend between poles to provide support for the grape vines. At least some of the trellis wires are grounded. A number of identical bird repelling devices are widely spaced throughout the vineyard. Each has a length much shorter than the distance between adjacent vineyard poles, the length being sufficient to allow a bird to land. The bird repelling devices have a circumference less than approximately one and one-half inch to allow the feet of a bird landing thereon to cover most of its circumference. Each bird repelling device is composed of an elongate insulating member and an electrically conductive rod secured to it. The rod is substantially as long as the elongate insulating member. A high voltage is applied to each electrically conductive rod. Each of the elongate insulating members is secured to a portion of the trellis wires parallel to the trellis wires. A bird landing on a bird repelling device completes a circuit between the trellis wire and the electrically conductive rod carried by that bird repelling device. This shocks the bird without substantially harming it so that the bird flies away. Mounting fixtures mounted on vineyard poles at the ends of rows readily accepts, holds, and automatically makes electrical contact with modified bird repelling devices.

Our prior art search with abstracts described above teaches: an animal training system, an apparatus for discouraging animals from a selected area, a method and apparatus for confining animals, a pest repelling apparatus and methods, a sea bird marine craft protector, an electric cattle guard, a pest bird control, a bird repelling system with improved mounting fixture, and a locking vehicle cover, but does not teach a cover with conductive stitching providing an electrical shock upon contact and wherein the cover may be cut and portions removed without effecting voltage to the remainder of the stitches. The present invention fulfills the need for a low cost flexible cover that may be cut to fit around and over objects but maintains its shock producing surface although cut.

SUMMARY OF THE INVENTION

The present invention teaches certain benefits in construction and use which give rise to the objectives described below.

A flexible blanket is made of plural layers including a pair of mutually insulated electrically conductive layers. Electrically conductive stitchings extend between the electrically conductive layers, and a top abrasion resistant layer and are exposed on its exterior surface. A voltage potential is applied between the conductive layers so that the exposed stitches can provide an electric shock to an animal's foot when it is brought into contact with the exposed surface.

A primary objective of the present invention is to provide an apparatus and method of use of such apparatus that yields advantages not taught by the prior art.

A further objective is to provide such an invention capable of providing voltage across stitches exposed on an outer surface.

A still further objective is to provide such an invention capable of being cut to fit an application, including having a portion cut out from the fabric, while maintaining its electrical potential between stitches over all of the remaining outfacing surface.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings:

FIG. 4A is cross sectional view of a portion of a second embodiment of the invention showing only a top three layers;

FIG. 4B is a cross sectional view of a portion of the second embodiment thereof showing all layers; and FIG. 5 is a plan view of a top electrically active layer thereof taken along cutting plane line 5—5 in FIG. 4A.

DETAILED DESCRIPTION OF THE INVENTION

The above described drawing figures illustrate the invention in at least one of its preferred embodiments, which is further defined in detail in the following description. Those having ordinary skill in the art may be able to make alterations and modifications in the present invention without departing from its spirit and scope. Therefore, it must be understood that the illustrated embodiments have been set forth only for the purposes of example and that they should not be taken as limiting the invention as defined in the following.

The present invention is a cover apparatus comprising a flexible fabric blanket made up of plural layers of electrically conductive materials and electrical insulating materials that are stitched or otherwise fabricated together as a single unit. A voltage is applied to the blanket when in use so that both positive and negative electrical potentials exist on one of its outer surfaces. Such a blanket is ideally useful for repelling birds from boats and other items. See FIG. 1.

Figure 2:
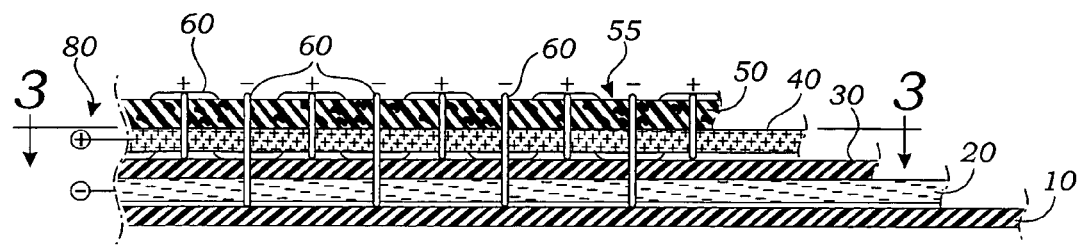
FIG. 2 is a cross sectional view of a portion of a first embodiment thereof.
Figure 3:
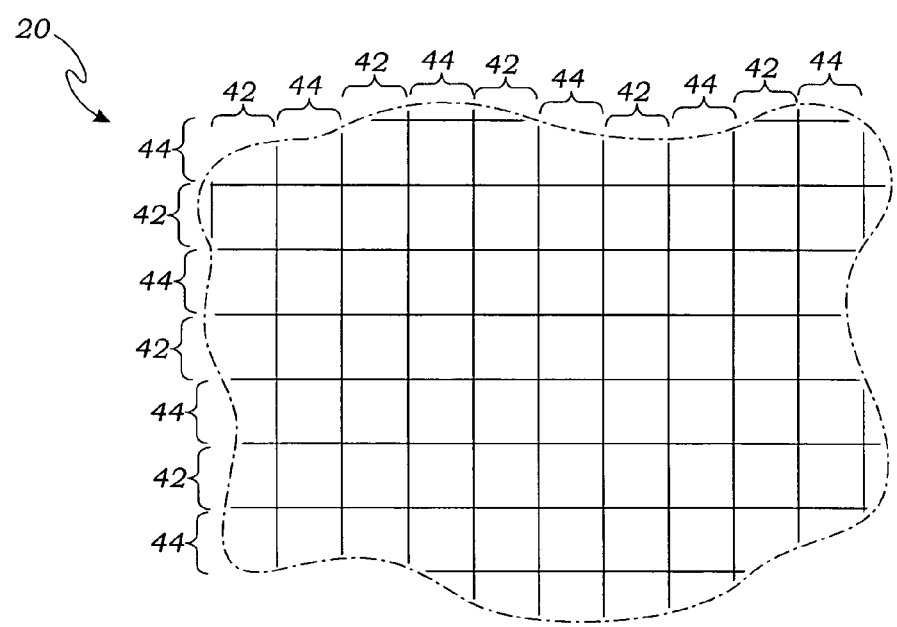
FIG. 3 is a schematic diagram of a plan view of a top electrically active layer taken along cutting plane line 3—3 in FIG. 2.

In a first embodiment, shown in cross section in FIG. 2, the invention comprises a plurality of fabric and plastic sheet layers including in sequence from a bottom to a top of the blanket apparatus, a bottom abrasion resistant layer 10 preferably of a material such as nylon or canvas, a bottom electrically active layer 20 preferably a woven fabric with all threads having an electrically conductive portion, an electrically insulating layer 30, preferably of a thin flexible plastic sheet stock such as polypropylene, a top electrically active layer 40, preferably a woven fabric with alternating electrically conductive portions 42, made up of threads 60 having a conductive metallic content; portions 42 being spaced apart by non-conductive portions 44, made up of threads 70 that have no conductive content and therefore remain electrically neutral. A typical pattern is shown in FIG. 3. A top abrasion resistant layer 50, preferably, as with layer 10, a nautical canvas or a nylon rip-stop material completes the stacked plurality of layers.

As shown in FIG. 2, a plurality of the electrically conductive threads 60 are sewn through the top abrasion resistant layer 50, and terminate in the conductive portions 42 of the top electrically active layer 40. These conductive threads 60 therefore are able to carry a voltage relative to ground potential to the outer surface 55 of top layer 50. This is shown with small plus symbols in the figure. A further plurality of the electrically conductive threads 60 are sewn through the top abrasion resistant layer 50, non-conductive portions 44 of the top electrically active layer 40, insulating layer 30, and terminate in the bottom electrically active layer 20. These further threads 60 are therefore able to conduct a second potential, preferably ground potential, to the surface 55. The electrically conductive threads 60 which make electrical contact with the two electrically active layers and the top layer 50 are placed in such mutual proximity and are of such prominence on the outer surface 55 of the top abrasion resistant layer 50 as to jointly contact a foot of a bird alighting on the blanket thereby providing an electrical shock to scare the bird away.

Preferably, the apparatus further comprises a means for applying an electrical potential difference 80 between the conductive portions 42 of the top electrically active layer 40 and the bottom electrically active layer 20 and this applying means 80 is preferably an electrical cord with conductors electrically contacted with the two electrically active layers 20, 40.

In this embodiment, the conductive portions of electrically active layer 20 are woven so that all of the threads that are in these portions 42 are electrically common. Likewise, all of the threads 60 that make up the electrically active layer 40 are electrically common. Therefore, portions of the blanket may be cut away leaving the remainder of the blanket fully electrically active. Likewise, portions of the blanket may be cut out, so as to fit the blanket over an obstruction (FIG. 1), while leaving the remaining blanket fully electrically active.

In a second embodiment of the present invention, shown in FIGS. 4A, 4B and 5, the top electrically active layer 40', refer here to FIG. 4A, is an electrically conductive fluid 45 held between a pair of insulating films 46, 46', the films pressed together and bonded in places to form the pattern of non-conductive portions 44 as they are void of the conductive fluid 45, and thereby forming the pattern of conductive portions 42 interspersed by default, with the non-conductive portions 44. It is noted, that in FIG. 5, the conductive portions 42 are all in electrical common. The fluid 45 is of a type that is curable to form a flexible solid such as would be the case if the fluid 45 were a liquid curable rubber loaded with a fine metallic powder, preferably copper filings. Such a curing step is preferably ultra-violet light or by elevated temperature baking. In FIG. 4A it is seen that threads 60 are sewn through abrasion resistant top layer 50, electrically conductive portions 42 of the top electrically active layer 40' and insulating layer 30. These threads 60 therefore are able to conduct a voltage potential to the outer surface 55 of layer 50 as shown.

As shown in FIG. 4B, the bottom electrically active layer 20' also is constructed using the electrically conductive fluid 45 held between a further pair of the insulating films 46, 46' wherein the entire layer 20' is electrically common, the conductive fluid 45 being curable as above. In this embodiment, a bottom insulating layer 15 may be necessary for receiving and holding the conductive stitches that penetrate the bottom electrically active layer 20'. The bottom insulating layer 10 is then preferably covered by the abrasion resistant layer 10.

After the blanket, of either embodiment has been placed onto or over the object to be protected, an alternating voltage is applied to the conductive layers 20 and 40 and therefrom, to the conductive stitches 60 that are exposed on surface 55.

Figure 1:
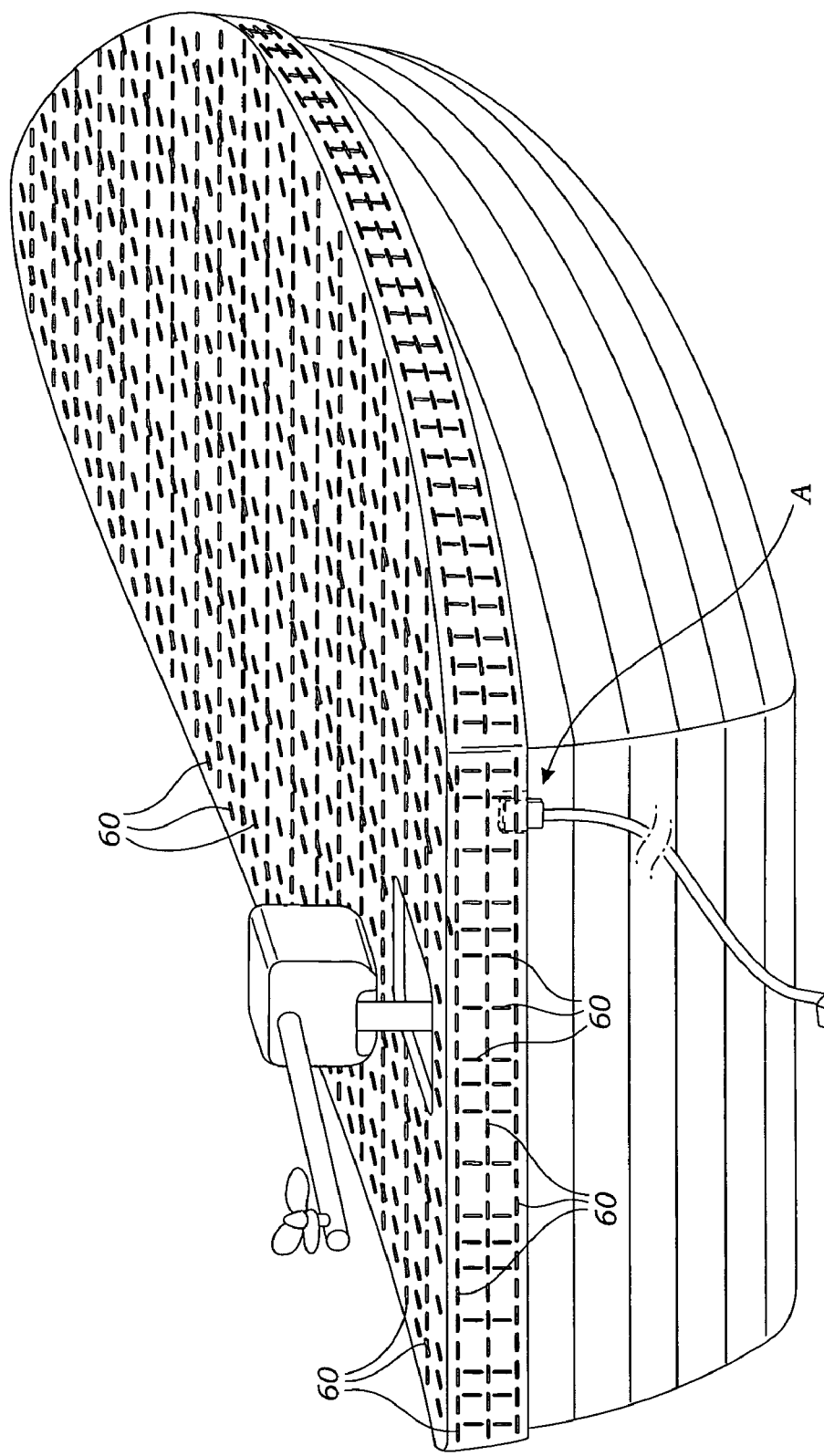
FIG. 1 is a perspective view of the present invention, a blanket or cover, as mounted on a small boat.

FIG. 1 shows that a portion of the blanket may be cut or a hole may be cut out of the blanket without losing voltage to the surface of the rest of the blanket. This is possible because all of the stitches 60 receive voltage from the underlying conductive layers 20, 40 or 20', 40' which are each a common electrical surface. Unless the blanket is fully severed, all of the stitches 60 will remain in electrical continuity with the source of voltage no matter how the blanket is cut up.

The words used in this specification to describe the invention and its various embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or elements of this described invention and its various embodiments are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the invention and its various embodiments below or that a single element may be substituted for two or more elements in a claim.

Changes from the claimed subject matter as viewed by a person with ordinary skill in the art, now known or later devised, are expressly contemplated as being equivalents within the scope of the invention and its various embodiments. Therefore, obvious substitutions now or later known to one with ordinary skill in the art are defined to be within the scope of the defined elements. The invention and its various embodiments are thus to be understood to include what is specifically illustrated and described above, what is conceptually equivalent, what can be obviously substituted, and also what essentially incorporates the essential idea of the invention.

While the invention has been described with reference to at least one preferred embodiment, it is to be clearly understood by those skilled in the art that the invention is not limited thereto. Rather, the scope of the invention is to be interpreted only in conjunction with the appended claims and it is made clear, here, that the inventor(s) believe that the claimed subject matter is the invention.

What is claimed is:

1. A blanket apparatus comprising: a plurality of layers including in sequence from a bottom to a top of the blanket apparatus, a bottom electrically active layer, an insulation layer, a top electrically active layer and a top abrasion resistant layer; the top active layer formed with a pattern of conductive portions interspersed with non-conductive portions; a plurality of electrically conductive stitches sewn only through the top abrasion layer resistant layer and the conductive portions of the top electrically active layer; a further plurality of electrically conductive stitches sewn through the top abrasion resistant layer, the non-conductive portions of the top electrically active layer, the insulation layer, and the bottom electrically active layer, the electrically conductive stitches in such mutual proximity and prominence on an outer surface of the top abrasion resistant layer as to jointly contact a foot of a bird alighting on the blanket.

2. The apparatus of claim 1 further comprising a bottom abrasion resistant layer integral with the blanket for protecting the electrically conductive threads.

3. The apparatus of claim 1 further comprising a means for applying an electrical potential between the bottom and the top electrically active layers and therefrom to the stitches on the top abrasion resistant layer.

4. The apparatus of claim 1 wherein the top electrically active layer is woven with electrically conductive threads and non-electrically conductive threads in a pattern producing the conductive portions and the non-conductive portions wherein all of the conductive portions are electrically common.

5. The apparatus of claim 1 wherein the bottom electrically active layer is woven with electrically conductive threads wherein all of the threads are electrically common.

6. The apparatus of claim 1 wherein the top electrically active layer is an electrically conductive initially viscous fluid held between a pair of insulating films, the films pressed together and bonded to form the pattern of non-conductive portions, and thereby forming the pattern of conductive portions interspersed with the non-conductive portions in such manner that the conductive portions are all electrically common, the fluid curable to form a flexible solid.

7. The apparatus of claim 1 wherein the bottom electrically active layer is an electrically conductive fluid held between a pair of insulating films, the conductive fluid curable to form a flexible solid.

* * * * *